United States Patent [19]

Wesdorp et al.

[11] Patent Number: 5,464,645
[45] Date of Patent: Nov. 7, 1995

[54] PROCESS OF MAKING A WATER CONTINUOUS DISPERSION WITH MORE THAN 50% DISPERSED PHASE AND PRODUCTS THEREOF

[75] Inventors: Leendert H. Wesdorp, Schledam, Netherlands; Robert A. Madsen, Ellicott City, Md.; Ian T. Norton, Rushden; Charles R. Brown, Bedford, both of Great Britain

[73] Assignee: Van den Bergh Foods Co., Division of Conopco, Inc., Lisle, Ill.

[21] Appl. No.: 196,611

[22] Filed: Feb. 15, 1994

Related U.S. Application Data

[63] Continuation-in-part of Ser. No. 899,670, Jun. 16, 1992, abandoned.

[51] Int. Cl.$^6$ .................... A23L 1/0522; A23L 1/0532; A23L 1/056; A23D 7/02
[52] U.S. Cl. .................... 426/573; 426/519; 426/524; 426/575; 426/576; 426/578; 426/603; 426/804
[58] Field of Search .................... 426/573, 575, 426/576, 578, 603, 524, 519, 804

[56] References Cited

U.S. PATENT DOCUMENTS

| | | |
|---|---|---|
| 3,519,436 | 7/1970 | Bauer et al. . |
| 3,519,436 | 7/1970 | Bauer et al. . |
| 4,089,981 | 5/1978 | Richardson . |
| 4,238,520 | 12/1980 | Miller et al. . |
| 4,273,790 | 6/1981 | Bosco et al. . |
| 4,273,795 | 6/1981 | Bosco et al. . |
| 4,279,941 | 7/1981 | Bosco et al. . |
| 4,284,655 | 8/1981 | Miller et al. . |
| 4,510,166 | 4/1985 | Lenchen et al. . |
| 4,726,957 | 2/1988 | Lacourse et al. . |
| 4,734,287 | 3/1988 | Singer et al. . |
| 4,849,234 | 7/1989 | Spinelli et al. . |
| 4,917,915 | 4/1990 | Cain et al. . |
| 4,937,091 | 6/1990 | Zallie et al. . |
| 4,956,193 | 9/1990 | Cain et al. . |
| 4,971,723 | 11/1990 | Chiu . |
| 5,151,290 | 9/1992 | Norton et al. . |

FOREIGN PATENT DOCUMENTS

| | | |
|---|---|---|
| 298561 | 11/1989 | European Pat. Off. . |
| 387940 | 10/1993 | European Pat. Off. . |
| 574973 | 12/1993 | European Pat. Off. . |
| 3613248 | 10/1986 | Germany . |

OTHER PUBLICATIONS

Handbook of Water–Soluble Gums and Resins.
Copending application: Eden et al., U.S. S/N 07/832, 838–Filed Feb. 7, 1992.
Copending application: Wesdorp et al.—S/N 07/976,236, filed Nov. 13, 1992.

*Primary Examiner*—Helen Pratt
*Attorney, Agent, or Firm*—A. Kate Huffman

[57] ABSTRACT

A process for preparing an edible plastic dispersion and products thereof wherein the dispersion comprises at least two gelling agents forming at least two distinct gelled phases and 0–20 wt. % of a fat. The dispersion contains a surplus A-dispersed phase and a B-continuous phase formed under the conditions of the process in contrast to a surplus A-continuous phase and B-dispersed phase formed under quiescent conditions.

13 Claims, 3 Drawing Sheets

PROCESS OF MAKING A WATER CONTINUOUS DISPERSION WITH MORE THAN 50% DISPERSED PHASE AND PRODUCTS THEREOF

RELATED APPLICATION

This application is a continuation-in-part of U.S. Ser. No. 07/899,670 filed Jun. 16, 1992 now abandoned.

FIELD OF THE INVENTION

The present invention is concerned with a process of making an edible plastic dispersion having a greater than 50 wt. % dispersed phase and products thereof.

BACKGROUND OF THE INVENTION

Edible dispersions with a plastic rheology usually have a high fat content. Often the fat is present as a continuous fat phase. Well-known edible, plastic dispersions are, for example, butter and margarine.

Many attempts have been made to find a replacement for fat in edible products. One reason why such a fat replacer is desirable is the wish to reduce the caloric content of the food product and other dietetic considerations while at the same time lower production cost, in particular by reducing raw material cost. If both goals are achieved a resulting product must still have consumer acceptable flavor, mouthfeel and long shelf life.

A substance that has been widely applied as a fat extender is water. This use of water has, for example, led to the introduction of the so-called halvarines: a substitute for butter and margarine containing only about 40% instead of the usual 80–85% fat. However, as with air, for example, water can also be employed only to a limited extent before adverse effects on the product properties are observed. To overcome this disadvantage it has been suggested that water should be used in combination with thickening agents, and in particular with gelling agents. This approach has led to substantial improvements of such products with substantially reduced fat content.

The structuring of the aqueous phase of food products such as spreads or dressings has been generally accomplished in the prior art by using biopolymers such as proteins and carbohydrates to structure the phase. Polymeric molecules cross-link to form a tangled, interconnected molecular network in water. In these systems, the presence of junction zones or entanglements leads to gel formation and the enclosure of water. Examples of such polymeric substances are hydrolyzed gelling starch and gelatin, as described in Cain et al. U.S. Pat. No. 4,956,193 (corresponding to EP 296,561 ).

U.S. Pat. No. 4,956,196 discloses edible plastic dispersions comprising at least two gelling agents (A and B) forming at least two gelled phases. The examples of the '196 patent disclose the preparation of such products by cooling a mixture of the gelling agents in water under quiescent conditions. Although not wishing to be bound by theory, it is believed that this method of preparation leads to the formation of two gelled phases, one being present as a continuous phase, the other being present as a non-continuous phase dispersed in the continuous phase. Generally the continuous phase will predominantly contain one of the gelling agents (A), possibly in combination with a small amount of the other gelling agent(s) (B). This continuous phase will thus be referred to as the "A-phase." The non-continuous phase will predominantly contain the other gelling agent (B), possibly in combination with a small amount of the other gelling agent(s) (A). This non-continuous phase will therefore be referred to as the "B-phase." For example, example 7 of U.S. Pat. No. 4,956,196 discloses a product with gelatin and hydrolyzed starch as the two gelling agents. At the levels and under the methodology given in example 7, it is believed that there will be formed a continuous hydrolyzed starch phase (which may possibly contain small amounts of gelatin) and a dispersed gelatin phase (which may possibly contain small amounts of hydrolyzed starch).

U.S. Pat. No. 4,849,234 discloses the preparation of water-in-oil emulsions containing 1–10 wt. % of thickening agents. Products obtained according to this process do not appear to contain two distinct aqueous phases.

EP 387,940 relates to fat continuous spreads containing 23 to 28 wt. % of a continuous fat phase.

EP 398,411 relates to fat continuous spreads containing gelatin as the predominant gelling agent.

Applicants have thus surprisingly discovered a process to provide a water continuous dispersion product in which the phase in excess is the dispersed phase (i.e., B-phase) and not the continuous phase (A-phase). The advantage of such products is that the amount of the continuous phase containing, for example, a starch material can be reduced without negatively effecting the product's texture and mouthfeel. Additionally, since the starch component is expensive and carries its own off flavors it is preferable to reduce the amount of this component in the final product.

SUMMARY OF THE INVENTION

It is thus an object of this invention to provide a process of making edible plastic dispersions which are water continuous and have a greater than 50% dispersed phase.

The dispersions of the present invention do not possess a continuous fat phase and include at least two condensed phases, at least one of which is water continuous.

The plastic dispersions comprise at least two gelling agents forming at least two distinct gelled phases and 0–20 wt. % of fat, the dispersions are prepared by a process comprising the steps of:

(1) providing a mixture of the gelling agents in water at an elevated temperature above the gel-forming temperature of two or more of these gelling agents; and (2) cooling and shearing said mixture such that the plastic dispersion has a different phase structure than a plastic dispersion prepared under quiescent conditions.

Applicants have also surprisingly discovered that starches purified by the process disclosed in U.S. Ser. No. 07/832,838 filed Feb. 7, 1992 by Kasica et al., and incorporated by reference may be used in spread compositions to eliminate starch off-flavor and provide products with improved flavor.

DETAILED DESCRIPTION OF PREFERRED EMBODIMENTS

The phase structure of the plastic dispersion, i.e. the form in which the various gelled phases are present in the system, can be determined by conventional techniques, for example microscopy (e.g. in combination with staining), measurements of the elastic modules, mouthfeel, and plasticity of the product. Preferably, however, the phase structure is determined by measuring the gel melting temperature of the system.

Figure 1:
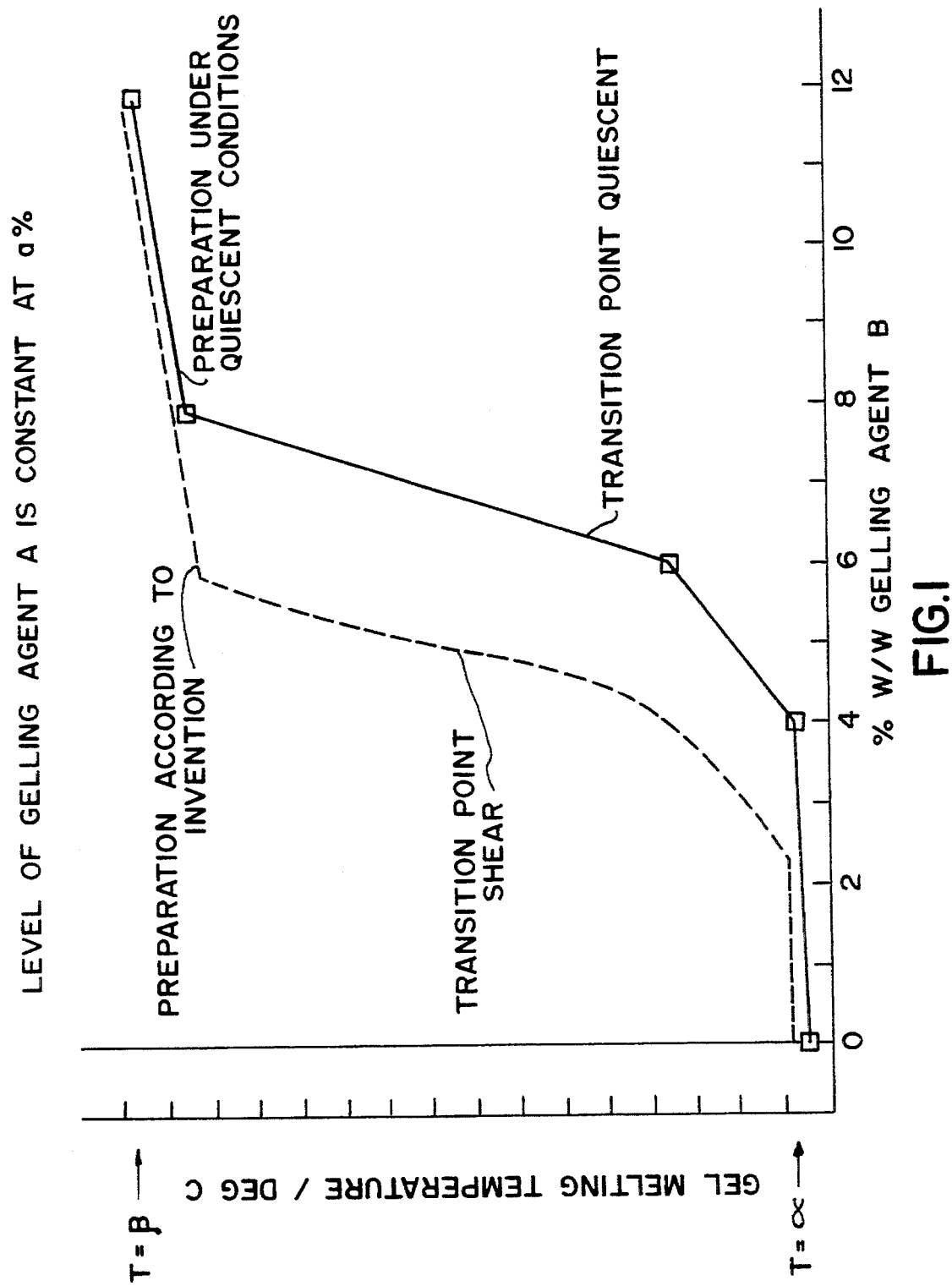
FIG. 1— a graph illustrating the transition point at which the claimed product shifts from A-continuous to B-continuous.

For example, the transition point can adequately be determined by measuring the gel melting temperature of the system as follows: If the system is A-continuous, the gel melting temperature will be $\alpha°$ C., while if the system is B-continuous, the gel melting temperature will be $\beta°$ C.; at the transition point, the system changes from having a gel melting temperature of $\alpha°$ C. to having a gel melting temperature of $\beta°$ C. This transition is illustrated in FIG. 1, where for a product prepared under quiescent conditions, at a constant level of gelling agent A, the level of gelling agent B is varied, leading to an A-continuous system (gel melting point $\alpha°$ C.) for low levels of B and a B-continuous system (gel melting point $\beta°$ C.) at higher levels of gelling agent B.

PROCESS OF FORMING SURPLUS DISPERSED PHASE

The dispersions of the invention are subjected to such conditions of cooling and shearing until at least one of the phases is gelled and the phase structure of the obtained dispersion is different from the phase structure of the same composition when prepared under quiescent conditions.

For the purpose of this invention, quiescent conditions are those which form an A-continuous phase which is greater than 50 wt. % of the total composition and a B-dispersed phase when gelling agent A (having a higher gelation rate) is combined with gelling agent B (having a lower gelation rate).

Quiescent conditions include cooling with a minimum shear needed to prevent the coalescence of the phases of gelling agents A and B into bulk phases from a hot mixture of the agents. For example, the shear rate plus residence time in a scraped surface heat exchanger (A-unit) which is used for cooling alone or in combination with residence time in a high shear mixer (C-unit) determine the prevention of bulk phases formation. A residence time of less than about 30 seconds, preferably less than about 15 seconds, in an A-unit would provide quiescent conditions. If an A-unit and C-unit are used, quiescent conditions are obtained with a combined residence time of less than 4 minutes.

In the inventive process, a combination of a higher shear rate and a longer residence time in an A-unit alone or in an A- and C-unit are required. The inventive process forms an A-dispersed phase and a B-continuous phase containing product. This product results when the higher gelation rate of the gelling agent A and the lower gelation rate of the gelling agent B phase invert to provide a greater than 50 wt. % A-dispersed phase. The residence time of the gelling agents A and B, according to the invention, should be more than about 4 minutes, more preferably from 5 to 100 minutes, most preferably from 6 to 15, in combined A- and C-units and/or a residence time of more than 30 seconds in the A-unit, more preferably more than 1 minute, most preferably from 2 to 15 minutes.

Especially preferred is the use of cooling conditions which involve the combined use of one or more A-units and one or more C-units, whereby the total residence time in said units is more than 4 minutes and the total residence time in the A-units is more than 30 seconds.

Shear may be applied during or after cooling, preferably while cooling. Shear conditions which will provide the required "phase inversion" of the two distinct aqueous phases are selected according to dimensions of A- and C-units. Generally the shear rate is not very critical and may, for example, be from 100 to 100,000 rpm, for example 200 to 10,000 rpm, especially 400 to 4000 rpm, when using a standard or conventional A- or C-unit.

Figure 2:
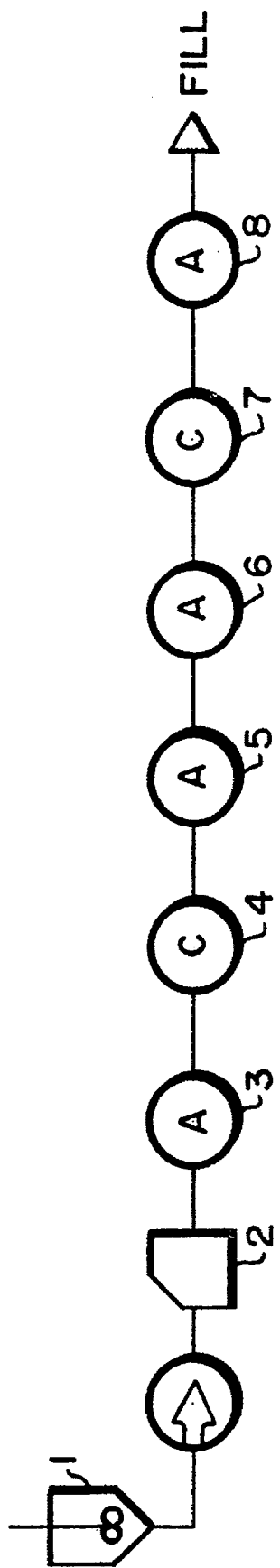
FIG. 2—diagrammatical illustration of the process for providing the water continuous dispersions according to the invention.

Referring to FIG. 2, the process comprises dispersing a selected gelling agent B (i.e. gelling starch) in cold water with stirring and heating to completely hydrate the gelling starch. A chosen gelling agent A, for example gelatin, is added to the hydrolyzed gelling starch along with any protein source, flavoring and color agent to form a solution. The solution is then cooled from its heated temperature to a temperature below a temperature at which the gelatin would break down in a stirring unit 1, preferably below about 65° C. The pH of the solution is adjusted to 5.0 by adding an acid, for example, lactic acid. A melted fat source may also be added to the mixture.

The composition is then preferably transferred from the stirring unit 1 to a homogenizer 2 to homogenize the composition. The homogenized composition is then preferably pasteurized preferably 80°–90° C. for an appropriate time, preferably about 3 minutes. In FIG. 2, an A-unit may be used to heat the homogenized composition to a pasteurizing temperature of $\geq 80°$ C. The pasteurized composition may be transferred to a mixing C-unit for a residence time to decrease cooling requirements to cool the pasteurized mixture down to the gelling temperature of the solution.

In a preferred embodiment, the cooled composition is passed through a second A-unit for an additional cooling.

The residence time and shearing of the composition in the cooling unit 5 and the mixer 7 finely disperses the gelled phase of gelling agent A so that the composition converts from a continuous phase to a surplus dispersed phase. The gelling phase of gelling agent B is simultaneously converted to the continuous phase in an amount of less than 50% wt. of the product.

In a preferred embodiment, the resulting water continuous dispersion is transferred from the mixer A-unit 7 to another cooling A-unit 8 for additional cooling to reduced cooling times prior to filling tubs for storage.

A difference in phase structure between the sheared product and the quiescent product can be evidenced by any suitable technique. Preferably the difference in phase structure is evidenced by a difference in gel melting temperature between the products. Preferably the absolute difference of the gel melting temperatures ($\sqrt{(quiescent-shear)^2}$) is more than 5° C., more preferably more than 7° C., most preferably more than 10° C. Generally the absolute difference in gel melting temperature will be less than 120° C., more generally less than 75° C. or even less than 50° C.

As indicated, the above described process allows for the preparation of gelled products with two or more gelling agents having a phase structure which is different from the same product as prepared under quiescent conditions.

Accordingly, a second embodiment of the invention relates to an edible plastic dispersion comprising at least two gelling agents forming at least two gelled phases, said dispersion having a different phase structure than the same dispersion when prepared under quiescent conditions.

Preferred products of the invention are spreads or dressings. Spreads or dressings in accordance with the invention preferably comprise less than 20 wt. % of fat, and 0.1 to 30% of biopolymers as the gelling agents.

The critical concentration of a gelling material (which may be a mixture of biopolymers) in a composition is the concentration at which the formation of the gel begins to be possible. The critical concentration of gelling agent A and gelling agent B not only depends on the nature of that gelling material but also on the composition of the aqueous system in which it is to form the gel, e.g., on the presence and concentration of salt, sugar, flavor compounds, etc. Consequently, the critical concentration of the gelling agents in the gelled phase may change if the kind or amount of one of the other ingredients contained in the composition is varied, as described in Cain U.S. Pat. No. 4,956,193; herein incorporated by reference.

GELLING AGENTS

Suitable gelling agents or biopolymer materials are, for example, carbohydrates, e.g., pectins, starches and carrageenan; or proteins, for example, milk protein, gelatin, soy protein, xanthan gum, locust bean gum, hydrolyzed starches (for example, Paselli SA2 and N-oil) and microcrystalline cellulose.

The two gelling materials are, for example, used in a weight ratio of 1:10 to 10:1. Preferably, one of the gelling agents is a gelling protein, most preferably gelatin. Also preferably the other gelling agent is a starch, more preferably a hydrolyzed starch such as Paselli SA2 or N-oil. Especially preferred dispersions according to the invention comprise gelatin and hydrolyzed starch, said dispersions being hydrolyzed starch continuous when prepared by the method of the invention, but gelatin continuous when prepared under quiescent conditions.

The amount of biopolymer in compositions of the invention is dependent on the desired degree of thickening or gelling and the presence of other ingredients in the composition. Usually the amount of gelling agent lies between 0.1 and 30%, mostly between 0.1 and 25% based on the weight of the product. If hydrolyzed starches are present, their level is preferably from 5–20%; other gelling agents are generally used at levels of up to 10%, mostly 1–7%, most preferably 2–5%, all percentages being based on the weight of the aqueous phase. Particularly preferred are combinations of about 5 to about 15% hydrolyzed starch and 0.5–5% of other gelling materials. Preferably, the other gelling material includes gelatin.

Starch or starch blends described in copending U.S. Ser. No. 07/976,236 filed on Nov. 13, 1992 now U.S. Pat. No. 5,338,560 by Wesdorp et al., which is a continuation-in-part of U.S. Ser. No. 07/899,443 filed on Jun. 16, 1992 now U.S. Pat. No. 5,279,844 may also be particularly preferred for the invention.

Starch or starch blends purified by a process disclosed in Examples 1 and 2 of U.S. Ser. No. 07/832,838 filed Feb. 7, 1992 now abandoned by Kasica et al. are also suitable for this invention.

Other gel forming materials which may be present in the edible dispersions include denatured whey protein, denatured bovine serum albumin, denatured soy protein, microcrystalline cellulose or a mixture of two or more thereof.

It is further preferred that the dispersion comprises a thickening agent.

The presence of a thickening agent can improve the oral response of the dispersion. A particularly preferred thickening agent is xanthan gum. Under mastication and during break-down of the dispersion, the structure produced by such thickening agent breaks down to some extent but prevents the product from getting very thin rapidly and causes some residual viscosity to be maintained, leading to a desirable consumer property.

To obtain optimal organoleptic characteristics, it is preferred for the dispersion that melts at a temperature between about 20° C. and about 45° C., more preferably between about 30° C. and about 37° C. This facilitates break-down in the mouth and prevents the dispersion from being perceived as waxy. The melting temperature of a gel can be measured using the following procedure: pour the sample into a glass test tube and allow it to set fully at 5° C. Then, place the tube in a water jacket connected to a programmable water bath. Place a steel ball on the surface of the sample and depress slightly in order to minimize surface tension effects. Equilibrate for one hour at 25° C. and then apply a heating regime of 0.5% C/min. The gel melting point is the temperature at which the ball begins to fall through the sample. Movement of the ball can be observed using a traveling microscope.

In addition to the gelling agent, gelling starch and solvent, the dispersion may comprise other ingredients as is considered desirable in view of the envisaged use by the consumer of the end product. For example, the dispersion may comprise coloring matter, e.g. beta-carotene, taste and flavor compounds, e.g., sodium chloride, or non-gelling milk protein, preservative, e.g., potassium sorbate, and thickening agents, e.g., non-gelling starch and/or protein and gums, e.g., xanthan gum. Preferably, both gel phases of gelling agents A and B are composed such that both contain ingredients other than the gelling materials in essentially the same concentrations. The liquid employed in the gel-forming compositions which is to act as solvent in which the gelling materials should be capable of forming gels, preferably consists essentially of water. However, a mixture of water with e.g., some alcohol, preferably ethanol, or another non-toxic liquid, can be employed as well.

The dispersion may further comprise material that forms an (additional) dispersed phase in the dispersion. For example, the dispersion may contain small particles of herbs and vegetable. The dispersion can then, for example, be used as vegetable spread. similarly, finely ground nuts or small cheese particles may be included to obtain a nut or cheese spread, respectively. Including such nut or cheese particles in the dispersion implies that some fat is incorporated in the dispersion. Preferably such fat is contained in a dispersed phase and does not form a continuous phase.

Preferably, the total fat content of the dispersion does not exceed 20 wt.%. More preferably, the fat content of the dispersion is 1–10 wt. % of the dispersion and most preferably 0 to 4 wt. %. Any fat present is preferably in the dispersed or discontinuous phases. Examples of suitable fats include butterfat, palm oil, palm mid-fraction, coconut oil and hydrogenated and/or purified soybean, cottonseed and sunflower oil. Some butterfat may, for example, be included in the dispersion by using as solvent in the gel-forming compositions whole milk or partially defatted milk or a mixture thereof with water. In this way, the fat incorporated in the product will be present in the form of small fat globules. It has been found to be beneficial for the organoleptic properties of the product if any fat included in the product is included in the form of small globules. The volume weighted mean diameter of the fat globules is preferably less than 20 μm. This can suitably be achieved, for example by homogenation of the composition at a temperature at which it is essentially liquid, followed by cooling to allow the product to set.

Generally, the balance of compositions of the invention will be water. The level of water may be from 10 to 99.8 wt. %, but generally the level will be more than 50 wt. %, more preferably more than 70 wt. % or even more than 80 wt. % and less than 98 wt. %, more preferably less than 95 wt. %.

STRESS-STRAIN RELATIONSHIP TEST

The rheological properties of a product can suitably be characterized by determining the stress-strain relation. This can be done with a series of measurements using a parallel plate "squeezing flow" geometry. The measurements are carried out using a parallel plate plastometer, wherein a block of the material to be tested is deformed between two parallel plates that move towards each other. (An apparatus that can suitably be used for these purposes is e.g., a Carrimed® apparatus). The deformation is inflicted at constant rate, preferably at a rate of deformation of $0.0167 s^{-1}$ (i.e., 100% compression in 1 minute). Thus, if the thickness of the material to be tested is doubled, then the rate at which one plate is moved towards the other is also doubled. The corresponding stress at increasing deformation (strain) is determined by recording the force that is required to keep the rate of deformation constant while the deformation magnitude increases. A series of such measurements is carried out on a series of blocks of the material to be tested, having varying thicknesses. From this series of measurements the stress-strain relation of the material being tested is then obtained by extrapolating the results to infinite thickness. The stress $\sigma$, usually express in kpa is recorded as function of the strain $\epsilon$, wherein $\epsilon= \ln(H_o/H)$, $H_o$ indicating the thickness of the test block, without any deformation, at the beginning of the measurement and H indicating the thickness of the block during the measurement while it is being squeezed between the two parallel plates. The stress-strain relation of a particular product is usually determined at a temperature representative for the temperature at which the product is to be used. Usually for the edible dispersion this will be between abut 5° C. and 25° C. In practice, mostly a temperature of about 15°–20° C. will be adequate. But, for example, for a product that is intended to be kept in a refrigerator, a temperature of e.g., 5° or 10° C. may be chosen preferably, the stress-strain relation is measured at a temperature of 15° C.

Figure 3:
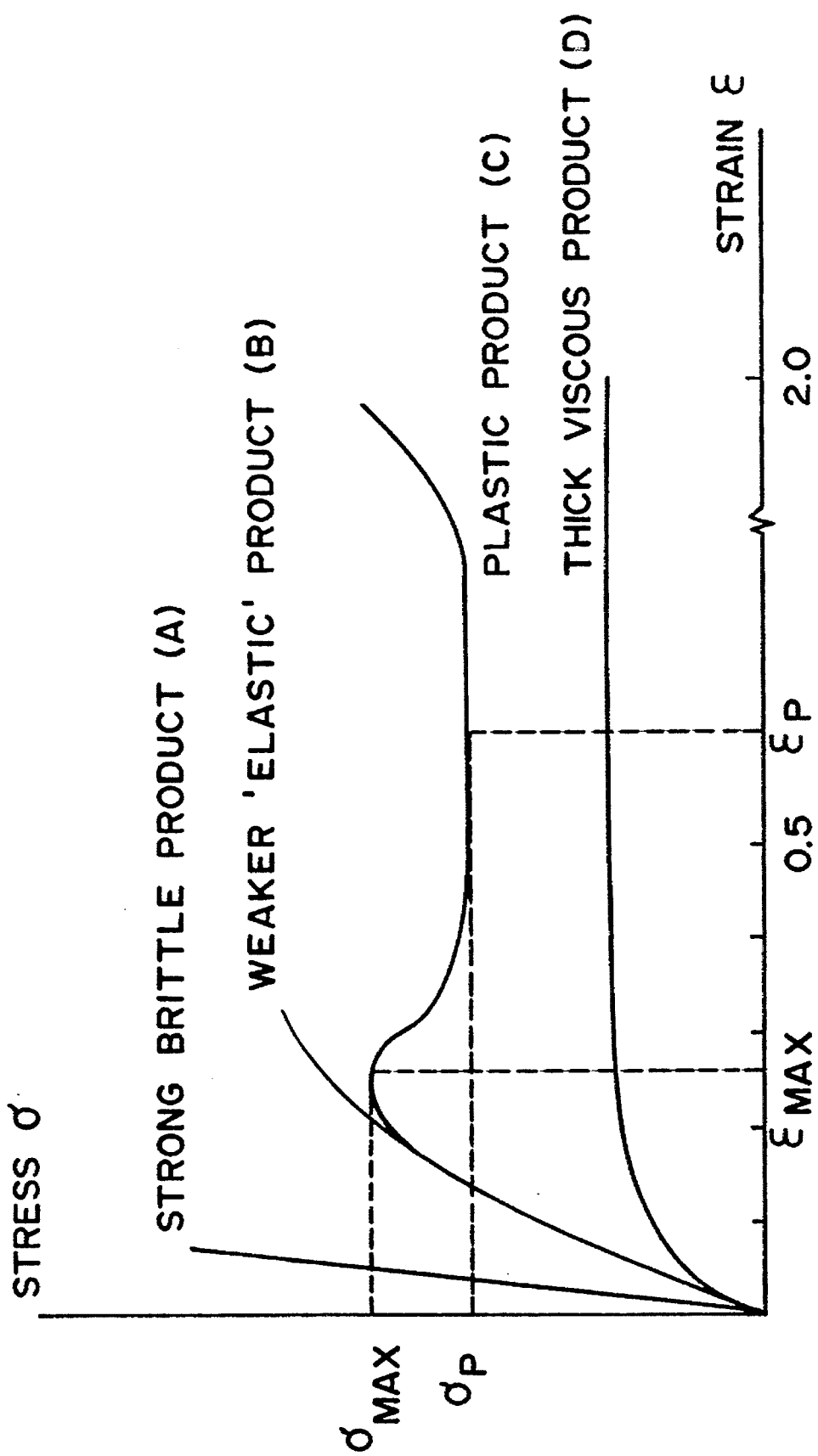
FIG. 3—a graph illustrating typical stress strain relation curves of strong brittle products to plastic products as described in the specification.

In FIG. 3 four curves are shown, illustrating typical stress-strain relations of elastic products, brittle ones and plastic ones, and of very thick but still essentially liquid products that do not retain their shape for longer periods of time.

Curve (A) of FIG. 3 is typical for the stress strain relation of strong brittle products, for example chocolate. Curve (B) is illustrative for a weaker, more elastic product, e.g., a gelatin jelly, curve (C) for a plastic product such as butter or margarine, and curve (D) for a thick, viscous liquid product, for example a concentrated syrup.

Characterizing features of a curve for a plastic product, having a desirable rheology, are the strain ($\epsilon_{max}$) at which the stress through a maximum ($\sigma_{max}$), the magnitude of that maximum stress and the ratio of the so-called plastic stress ($\sigma_p$) and the maximum stress $\sigma^*\alpha\xi$. In an ideal system, the curve of the plastic product exhibits a maximum in the stress at a relatively small deformation $\epsilon$ and then exhibits, at somewhat large deformation, a region at which the stress remains constant at increasing deformation, i.e., showing a horizontal plateau. This part at which the slope of the curve ideally is zero, is called the plastic flow region. The stress in this region is called the plastic stress.

In practice, the curve of the stress-strain relation in the plastic flow region usually is not strictly horizontal. To prevent confusion about the point of the curve that determines the plastic stress, in case there is no horizontal plateau in the curve, the plastic stress is chosen to be the stress at the inflexion point. The strain at that point is indicated as $\sigma_{max}$, $\sigma_p$, $\epsilon_p$, $\epsilon_{max}$ are indicated in FIG. 3.

Generally, the present edible plastic dispersion has a stress-strain relation with a maximum stress occurring at a strain ($\epsilon_{max}$) of 0.001–2, the maximum stress at strain $\epsilon_{max}$ ($\sigma_{max}$) being 0.01–100 kpa and with a ratio of the plastic stress ($\sigma_p$) and the maximum stress $\sigma_{max}$ ($\sigma_p/\sigma_{max}$) of 0.1–1.

Preferably, the dispersion has a stress-strain relation with $\epsilon_{max}$ is 0.01–0.5, $\sigma_{max}$ is 0.3–60 kPa and $\sigma_{max}$ is 0.2–0.95, more preferably, $\epsilon_{max}$ is 0.05–0.3, $\sigma_{max}$ is 0.8–30 kPa and $\sigma_p/\sigma_{max}$ is 0.3–0.8.

The present dispersion can suitable be used e.g., as bread spread to replace e.g., margarine or halvarine but, as described above, it can also be suitable for use as e.g., cheese, nut or vegetable spread by incorporating appropriate ingredients in the dispersion. Similarly, the dispersion can suitably be employed as dessert, topping or filling, rather than as spread, by incorporating appropriate ingredients, e.g., color and flavor compounds.

However, the present dispersion can also advantageously be employed in the preparation of other food products, e.g., to reduce the fat content thereof. Similarly, in the preparation of food products a composition that would constitute the present dispersion if it were allowed to set, for example by keeping it at room temperature, can advantageously be used. For instance, excellent mayonnaise-like food products with a reduced fat content can be prepared in this manner.

Another example of a food product of which the fat content can thus be reduced is pate. Such a product can be prepared by separately preparing pate and plastic dispersion, and subsequently combining them by cold mixing, for example in a bowl chopper or with a colloid mill. Alternatively, a fluid composition that would constitute the present dispersion if allowed to set, can be admixed with the pate composition at elevated temperature, for example just before or after pasteurization, following which the overall composition is processed as an ordinary pate composition.

Furthermore, parts of the composition that would constitute the present dispersion, if allowed to set, can be incorporated in separate steps. For example, if the composition contains heat-sensitive ingredients, it can be beneficial to include a solution or dispersion of these ingredients after the pasteurization, whereas the other part is admixed with the pate composition before the pasteurization.

Other food products with reduced fat content can be made in a similar manner.

Accordingly, the invention provides food products containing the present dispersion or a composition that would constitute the present dispersion, if allowed to set, for example by keeping it at ambient temperatures, the balance consisting of edible matter.

The invention will be illustrated in the following nonlimiting examples.

EXAMPLE 1

Eight tub samples of the following formulation was prepared:

| Ingredients | % wt. |
|---|---|
| Gelatin | 3.00 |
| N-lite D ® Starch[1] | 7.50 |
| Buttermilk powder | 2.00 |
| Salt | 1.10 |
| Potassium sorbate | 0.13 |
| Beta-carotene | 0.05 |
| Kaomel ® fat[2] | 3.00 |
| Water to Balance | 100 |

[1] N-lite D ® Starch is a hydrolyzed maltodextrin starch obtained from National Starch and Chemical Company of Bridgewater, NJ.
[2] Kaomel ® is a partially hydrogenated soybean/cottonseed oil obtained from Van den Bergh Foods of Joliet, IL.

The foregoing composition was prepared by dispersing the N-lite D® Starch in cold water and heating while stirring in a stirring tank to 80° to completely hydrate the starch. The gelatin, buttermilk powder, potassium sulfate and beta-carotene were added to dissolve. The solution was then cooled to 60° in a stirring unit.

Lactic acid was added to obtain a pH of 5.0 in then melted Kaomel® was added to the mixture still maintained at 60°. The composition was then passed through a homogenizer at 100 bar to homogenize.

The homogenized compositions were then passed into a cooling unit (A) and cooled to the temperatures indicated in Table 1 below. Some of the compositions were additionally passed from the cooling unit (A) to a mixing unit (C) at the temperatures presented in Table 1 below:

TABLE 1

| Tub # | Cooling Unit A (°C.) | Mixing Unit C (°C.) |
|---|---|---|
| 1 | 7.48 | — |
| 2 | 7.58 | — |
| 3 | 7.66 | 24 |
| 4 | 7.35 | 22 |
| 5 | 7.40 | 20 |
| 6 | 7.64 | 18 |
| 7 | 7.95 | 18 |
| 8 | 8.22 | 18 |

The cooling units (A) were run at a rate of 1800 rpm. The mixing units (C) for the compositions filled in tubs 3–5 were run at a rate of 200 rpm. The mixing units for the compositions filled in tubs 6–8 were run at a speed of 1800 rpm.

It was observed that the compositions in tubs 1 and 2 produced an obvious gelatin-continuous sample. The compositions of tubs 3–5 produced a starch-continuous product upon filling and the samples were increasingly thicker from tubs 3–5. The compositions of tubs 6–8 also produced starch-continuous product which were thicker in texture than the compositions of tubs 3–5.

The compositions of tubs 3–5 having a (C) unit run at 200 rpm were coarse upon spreading and set up after 19 hours.

The compositions having a (C) unit run at 1800 rpm (tubs 6–8) produced products having a smoother texture than the compositions of tubs 3–5.

The compositions having starch levels of greater than 9% produced by the prior art process yielded dispersions which were gelatin continuous and did not possess acceptable spread characteristics. Compositions produced according to the inventive process contain less than 9% starch were starch continuous and yet produce spreads having consumer acceptable characteristics.

EXAMPLE 2

A composition containing 8.5% wt. of 6110:97-2 starch blend rather that the N-Lite D® starch was prepared according to Example 1 with the following exception. An additional cooling unit cooling the mixture to between 5°–10° C. was used.

Starch blend 6110:97-2 is a blend of modified food starches, having rheological properties, characterized by a log $G'_{max}$ of 5.0 after complete dispersion in water at a starch solids of 17.2% and a log G' of 4.70 (log of ½G') at 6486 seconds after dispersion as described in copending application Ser. No. 07/976,236 filed on Nov. 13, 1992 by Wesdorp et al. herein incorporated by reference. The starch blend was supplied by National starch and Chemical Company of Bridgewater, N.J.

It was observed that the resulting composition was starch continuous and had acceptable spreading characteristics.

EXAMPLE 3

Eight compositions containing 7.80% wt. of a modified tapioca starch rather than 7.50 N-lite D® starch is prepared according to Example 1.

The compositions are filled into tubs.

It is observed that the compositions are much thicker than prior art starches and have improved spread characteristics.

EXAMPLE 4

Several systems of gelatin and maltodextrin (Paselli SA2) were prepared according to two methods. Method 1 involves the preparation of gelatin/maltodextrin mixtures in water by dissolving the maltodextrin at 90° C., cooling to 60° C., followed by adding the gelatin and cooling under quiescent conditions. Method 2 involves the same method except that the mixture is cooled in a combination of an A- and C-unit for 30 minutes while shearing at 800 rpm.

The gelatin concentration was 3 wt. % for all systems, the concentration of Paselli SA2 was varied between 2 and 20 wt. %. For all systems the gel melting temperature was determined. The following results were obtained.

| Concentration Paselli SA2 | Gel Melting Temperature (°C.) | |
|---|---|---|
| (wt. %) | Method 1 | Method 2 |
| 2 | 28 | 30 |
| 4 | 28 | 30 |
| 6 | 28 | 33 |
| 8 | 28 | 37 |
| 10 | 28 | 57 |
| 12 | 28 | 55 |
| 14 | 32 | 60 |
| 16 | 60 | 68 |
| 18 | 55 | n.m |
| 20 | 55 | n.m |

These results show that for concentrations of maltodextrin of between about 6 and about 14 wt. %, the system prepared according to the invention has a different phase structure than the composition as prepared under quiescent conditions.

We claim:

1. A process for preparing a water continuous edible dispersion having at least two gelling agents forming at least two phases and 0 to 20 wt. % of a fat, the process comprising the steps of:
   a. mixing together a gelling agent A having a higher gelation rate with a gelling agent B having a lower gelation rate which under quiescent conditions form a mixture having more than 50% of an A-continuous phase and a B-dispersed phase, based on total dispersion;
   b. heating the mixture of gelling agents A and B to an elevated temperature above a gel-forming temperature of the agents A and B; and
   c. cooling and shearing the mixture for a residence time sufficient to form the gelling phase of gelling agent A such that the A-continuous phase is inverted to a greater than 50% A-dispersed phase and the B-dispersed phase is inverted to a B-continuous phase of the total edible dispersion.

2. A process according to claim 1 wherein the quiescent conditions include using minimum shear to prevent coalescence of the A-continuous phase and the B-dispersed phase into bulk phases.

3. A process according to claim 1 wherein the edible dispersion is plastic and has a stress-strain relation of $\epsilon_{max}$ is 0.001–2, $\sigma_{max}$ is 0.01–100 kPa and $\sigma_p/\sigma_{max}$ is 0.1–1.

4. A process according to claim 1 wherein the gelling agents A and B are selected from a group consisting of pectins, starches, carrageenan, hydrolyzed starches, debranched amylopectin, microcrystalline cellulose, milk protein, gelatin, soy protein and mixtures thereof.

5. A process according to claim 4 wherein gelling agent A is gelatin and gelling agent B is hydrolyzed starch.

6. A process according to claim 1 wherein the residence time of the process is more than 30 seconds in an A-unit.

7. A process according to claim 1 wherein the gelling agent B is present in an amount of between about 6 and about 14 wt. %.

8. A water continuous edible dispersion comprising 0 to 20 wt. % fat and at least two gelling agents which form at least two phases formed by a process comprising the steps of:
   a. mixing together a gelling agent A having a higher gelation rate with a gelling agent B having a lower gelation rate which under quiescent conditions form a mixture having more than 50% of an A-continuous phase and a B-dispersed phase, based on total dispersion;
   b. heating the mixture of gelling agents A and B to an elevated temperature above a gel-forming temperature of the agents A and B; and
   c. cooling and shearing the mixture for a residence time sufficient to form the gelling phase of gelling agent A such that the A-continuous phase is inverted to a greater than 50% A-dispersed phase and the B-dispersed phase is inverted to a B-continuous phase of the total edible dispersion.

9. An edible dispersion according to claim 8 wherein the edible dispersion is plastic and has a stress-strain relation of $\epsilon_{max}$ is 0.05–0.3, $\sigma_{max}$ is 0.8–30 kPa and $\sigma_p/\sigma_{max}$ is 0.3–0.8.

10. An edible dispersion according to claim 8 wherein the gelling agents A and B are selected from a group consisting of pectins, starches, carrageenan, hydrolyzed starches, debranched amylopectin, microcrystalline cellulose, milk protein, gelatin, soy protein and mixtures thereof.

11. An edible dispersion according to claim 8 wherein gelling agent A is gelatin and gelling agent B is hydrolyzed starch.

12. An edible dispersion according to claim 8 wherein the residence time of the process is more than 30 seconds in an A-unit.

13. An edible dispersion according to claim 8 wherein the gelling agent B is present in an amount of between about 6 and about 14 wt. %.

* * * * *